(12) United States Patent
Liao et al.

(10) Patent No.: US 9,207,770 B2
(45) Date of Patent: Dec. 8, 2015

(54) INFORMATION DISPLAY SYSTEM AUTOMATICALLY ADJUSTING PROJECTION AREA AND METHOD THEREOF

(71) Applicant: AUTOMOTIVE RESEARCH & TEST CENTER, Changhua County (TW)

(72) Inventors: Yu-Sheng Liao, Changhua County (TW); Yu-Sung Chen, Changhua County (TW); Chih-Bin Chiang, Changhua County (TW)

(73) Assignee: Automotive Research & Test Center, Changhua County (TW)

( * ) Notice: Subject to any disclaimer, the term of this patent is extended or adjusted under 35 U.S.C. 154(b) by 116 days.

(21) Appl. No.: 14/138,928

(22) Filed: Dec. 23, 2013

(65) Prior Publication Data

US 2015/0145761 A1    May 28, 2015

(30) Foreign Application Priority Data

Nov. 26, 2013   (TW) .............................. 102142987 A (51) Int. Cl.
| | |
|---|---|
| *G03B 21/14* | (2006.01) |
| *G06F 3/01* | (2006.01) |
| *H04N 5/74* | (2006.01) |
| *G06K 9/00* | (2006.01) |

(Continued)

(52) U.S. Cl.
CPC ............ *G06F 3/017* (2013.01); *G02B 27/0179* (2013.01); *G03B 21/14* (2013.01); *G06K 9/00221* (2013.01); *H04N 5/74* (2013.01); *H04N 9/3185* (2013.01); *H04N 9/3194* (2013.01); *G02B 2027/0181* (2013.01)

(58) Field of Classification Search
CPC . H04N 9/3185; H04N 9/3194; H04N 9/3197; G03B 21/14; G03B 21/21
USPC ............ 353/7, 13, 69, 70, 119; 382/100, 103, 382/118, 128, 167, 168, 254; 348/77, 169, 348/231.2, 743–747
See application file for complete search history.

(56) References Cited

U.S. PATENT DOCUMENTS

| | | | |
|---|---|---|---|
| 6,877,862 B2 * | 4/2005 | Fukunaga | G03B 21/28 353/70 |
| 7,031,067 B2 | 4/2006 | Voloschenko et al. | |
| 7,777,960 B2 | 8/2010 | Freeman | |

(Continued)

FOREIGN PATENT DOCUMENTS

| | | |
|---|---|---|
| CN | 201010161201.1 | 4/2010 |
| CN | 201020627890.6 | 11/2010 |

(Continued)

*Primary Examiner* — Sultan Chowdhury
(74) *Attorney, Agent, or Firm* — Rosenberg, Klein & Lee (57) ABSTRACT

The present invention discloses an information display system automatically adjusting the projection area and a method thereof. The method comprises steps: using a detection module to capture images of a driver and measure a distance between the detection module and the driver; recognize facial features of a driver (including a position of the driver's eye, a rotation angle of the driver's face, and a direction the driver fixates) to estimate a required displacement of the projection area on the windshield (i.e. the region inside the visual field of the driver); moving or rotating the projection device according to the required displacement of the projection area to make the projection device project images of driving information onto a correct region on the windshield.

10 Claims, 6 Drawing Sheets

(51) Int. Cl.
*G02B 27/01* (2006.01)
*H04N 9/31* (2006.01)

(56) References Cited

U.S. PATENT DOCUMENTS

| | | |
|---|---|---|
| 7,972,003 B2 | 7/2011 | Mori et al. |
| 8,104,894 B2 | 1/2012 | Mori et al. |
| 8,172,407 B2 * | 5/2012 | Lim ................... G06K 9/2036 353/69 |
| 2006/0022808 A1 * | 2/2006 | Ito et al. .................... 340/425.5 |
| 2011/0242669 A1 | 10/2011 | Torii |
| 2011/0267701 A1 | 11/2011 | Moussa et al. |
| 2013/0066549 A1 | 3/2013 | Wu et al. |
| 2013/0182228 A1 * | 7/2013 | Ishikawa et al. ................. 353/13 |
| 2013/0235351 A1 * | 9/2013 | Sachdev et al. ................. 353/13 |

FOREIGN PATENT DOCUMENTS

| | | |
|---|---|---|
| TW | M279528 | 6/1994 |
| TW | M322044 | 4/1996 |
| TW | 201024133 A1 | 7/2010 |
| TW | 291132527 A1 | 10/2011 |

* cited by examiner

INFORMATION DISPLAY SYSTEM AUTOMATICALLY ADJUSTING PROJECTION AREA AND METHOD THEREOF

ADJUSTING PROJECTION AREA AND METHOD THEREOF

This application claims priority for Taiwan patent application no. 102142987 filed on Nov. 26, 2013, the content of which is incorporated by reference in it entity.

BACKGROUND OF THE INVENTION

1. Field of the Invention

The present invention relates to a head-up display technology, particularly to an information display system automatically adjusting the projection area and a method thereof 2. Description of the Related Art Automobiles have been highly popularized in the developed countries, and have become more and more popularized in the emerging market countries. However, traffic accidents also increase with popularization of automobiles. Many traffic accidents are due to rear-end collision. In order to promote driving safety, many automobiles have been equipped with head-up display devices, which can project the images of driving information that is originally presented on the dashboard onto the windshield of an automobile, whereby the driver can view the road conditions and the driving information simultaneously without distraction.

The head-up display devices available in the market are mainly to present the driving speed. Some high-end head-up display devices also present GPS information, warning signals and the distance between the driver's automobile and the front automobile to indicate the driver whether he has a safe driving speed and a safe following distance, whereby the driver has sufficient time to undertake appropriate operations, such as decelerating the automobile, wherefore traffic accidents are less likely to occur. The appropriate projection area of a head-up display device varies with individual drivers. While a different driver drives the automobile or the original driver has adjusted position of seat, the driver may be unable to view the complete image if the head-up display device still projects the images on the original projection area. For example, the Is steering wheel obstructs the vision of the driver. For another example, the sightline of viewing the driving information does not coincide with the sightline of observing the road condition, and the driver is inconvenient to view the road condition and the driving information simultaneously. Besides, while the driver turns his head or his sightline, the conventional head-up display device is unable to move the projection area with the head or the sightline of the driver.

Accordingly, the present invention proposes an information display system automatically adjusting the projection area and a method thereof to overcome the abovementioned problems.

SUMMARY OF THE INVENTION

The primary objective of the present invention is to provide an information display system automatically adjusting the projection area and a method thereof, wherein the information display system can automatically adjust the projection area, whereby the driver can always view the complete image provided by the system no matter what postures or positions of a driver.

Another objective of the present invention is to provide an information display system automatically adjusting the projection area, which uses sensors to detect the positions of the head and eyes of the drivers and works out the region where the driver's sightlines are fixated on the windshield to determine the area where the information image should be projected.

To achieve the abovementioned objectives, the present invention proposes an information display system automatically adjusting the projection area, which comprises a detection module capturing images of the driver and detecting the distance between the driver and the detection module; a projection device projecting a plurality of images of driving information on a projection area before the driver; a data processing module connected with the detection module, using image processing techniques and distance estimation results to recognize facial features of a driver, recording parameters of the projection device, and using the facial feature parameters of a driver to calculate a required displacement of the projection area; and a controller connected with the data processing module and the projection device, estimating the offsets of the parameters of the projection device according to the required displacement of the projection area, driving the projection device to move or rotate according to the offsets of the parameters to make the projection device project images of driving information on a new projection area.

The present invention also proposes an information display method automatically adjusting the projection area, which comprises following steps: using a detection module to capture images of the driver and detect the distance between the driver and the detection module; using image processing techniques and distance estimation results to recognize facial features of a driver, recording a plurality of parameters of the projection device, and a required displacement of the projection area can be estimated by driver's facial feature and the parameters); estimating the offsets of the parameters of the projection device according to the required displacement of the projection area; driving the projection device to move or rotate according to the offsets of the parameters to make the projection device project images of driving information on a new projection area before the driver.

DETAILED DESCRIPTION OF THE INVENTION

The present invention pertains to an information display system automatically adjusting the projection area and a method thereof, which can estimate the position of the driver's face and the visual field of the driver and automatically adjust the position and angle of the projection device to make the projection device project images of driving information onto a projection area inside the visual field of the driver, whereby the driver can always view the complete image provided by the system no matter what postures or positions of a driver.

Figure 1:
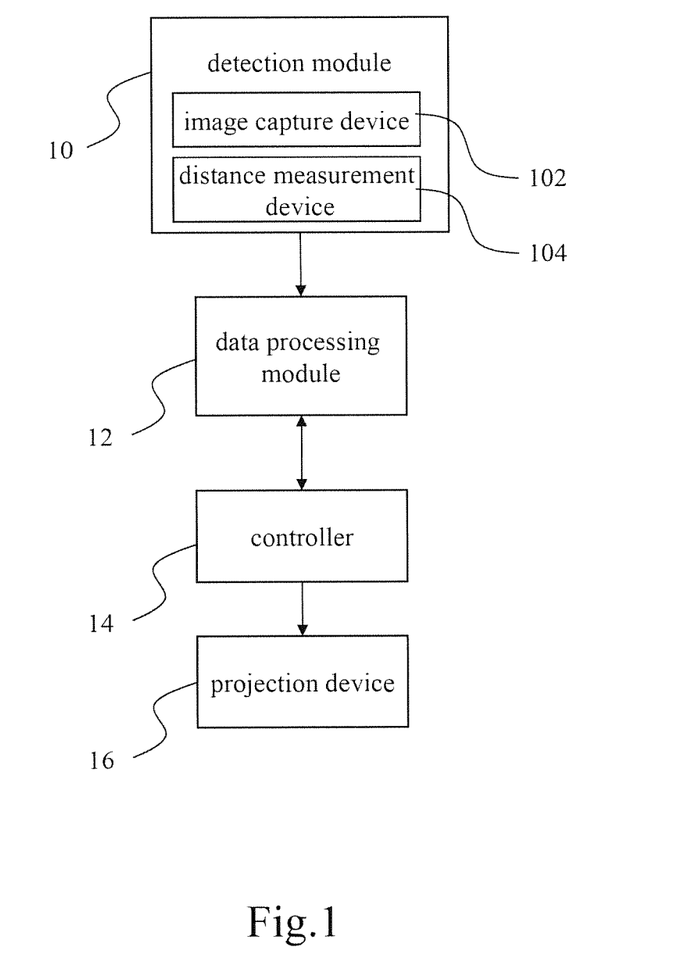
FIG. 1 is a block diagram schematically showing an information display system automatically adjusting the projection area according to one embodiment of the present invention.

Refer to FIG. 1, which is a block diagram schematically showing an information display system automatically adjusting the projection area according to one embodiment of the present invention. The system of the present invention comprises a detection module 10, a data processing module 12, a controller 14 and a projection device 16. The detection module 10 at least includes an image capture device 102 capturing images of the driver and a distance measurement device 104 measuring the distance between the detection module 10 and the driver. In some embodiments, the image capture module 102 is a camera, and the distance measurement device 104 is an infrared distance measurement device. However, the present invention neither limits that the image capture device 102 must be a camera nor limits that the distance measurement device 104 must be an infrared distance measurement device. The data processing module 12 is connected with the detection module 10 and uses the images of the driver and the distance between the detection module 10 and the driver to obtain facial features of a driver. The facial features include the 3D positional coordinates of the eyes, the opening state of the eyes, the rotation angle of the face, and the area at which the driver watches. The data processing module 12 also records the parameters of the projection device 16, including the position and angle of the projection device 16. The data processing module 12 uses the facial features of the driver and the parameters of the projection device 16 to estimate a required displacement of the projection area. The controller 14 is connected with the data processing module 12 and the projection device 16, estimates the offsets of the parameters of the projection device 16 according to the required displacement of the projection area, drives the projection device 16 to move or rotate according to the offsets of the parameters to make the projection device 16 project images of driving information on a new projection area before the driver, such as a windshield, a reflective optical film stuck to the windshield, or a projection plate.

The driving information is obtained from a navigation system and at least one vehicle state sensor. The driving information includes a navigation map and the speed of the vehicle. The projection device projects the images of the driving information on the windshield of the vehicle. In the present invention, the driver can always view the complete image provided by the information display system no matter what postures or positions of a driver. In some embodiments, the projection device cooperates with a movable optical mechanism. The movable optical mechanism is arranged in the front of the projection device and diverts the light beam projected by the projection device. Alternatively, the movable optical mechanism is arranged inside the projection device and deflects the light beam projected by the projection device. Thereby, the projection area is adjusted.

Figure 2:
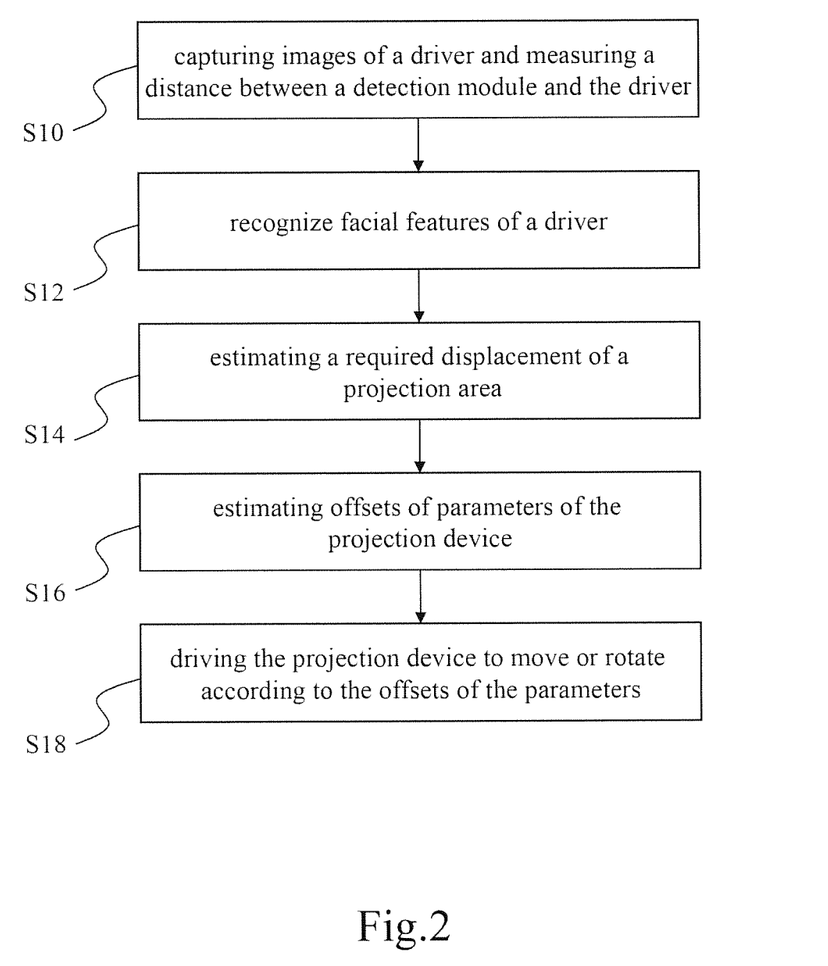
FIG. 2 is a flowchart of an information display method automatically adjusting the projection area according to one embodiment of the present invention.

FIG. 2 is a flowchart shows an information display method automatically adjusting the projection area according to one embodiment of the present invention. In Step S10, use an image capture device 102 of a detection module 10 to capture images of the driver, and use a distance measurement device 104 of the detection module 10 to measure the distance between the detection module 10 and the driver. In Step S12, use the images of the driver and the distance between the detection module 10 and the driver to recognize facial features of a driver, and record the parameters of a projection device 16, including the position and angle of the projection device 16. In Step S14, use facial features of the driver and the parameters of the projection device 16 to estimate a required displacement of the projection area. In Step S16, estimate the offsets of the parameters of the projection device 16, including a shift distance and a rotation angle of the projection device 16, according to the required displacement of the projection area. In Step S18, drive the projection device 16 to move or rotate according to the offsets of the parameters to make the projection device 16 project images of driving information onto a new projection area before the driver.

Figure 3:
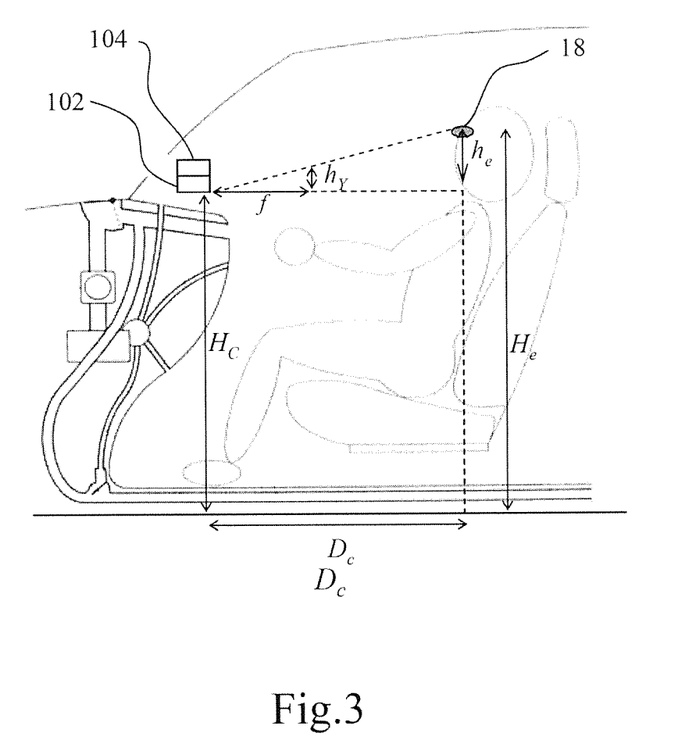
FIG. 3 is a diagram schematically showing the distance between the driver and the image capture device and the altitude of the driver's eyes with respect to the ground according to one embodiment of the present invention.

In Step S12, the distance measurement device 104 is used to obtain the distance between the eyes and the image capture device 102, and then trigonometric functions are used to calculate the altitude of the eyes with respect to the ground. Refer to FIG. 3. The distance measurement device 104 is joined to the image capture device 102 to facilitate measuring the distance Dc between the eye 18 and the image capture device 102. Let He denote the altitude of the image capture device 102 with respect to the ground. Thus, the relative distance $h_e$ between the altitude of the eye 18 and the altitude of the image capture device 102 can be expressed by $h_e = D_c * (h_y/f)$. Then, the altitude He of the eye 18 with respect to the ground can be calculated from $H_e = H_c + h_e$.

Figure 4A:
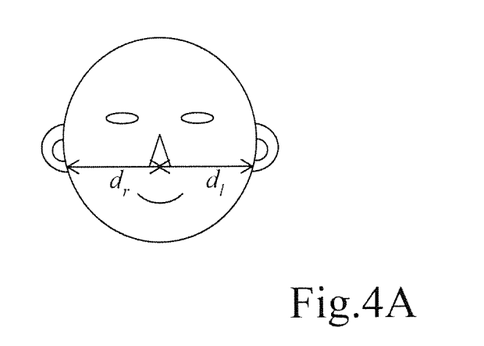
FIGS. 4A-4C are diagrams schematically showing the rotation angle of the driver's face according to one embodiment of the present invention.
Figure 4B:
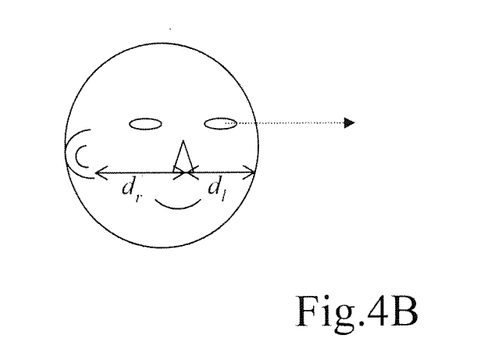
Figure 4C:
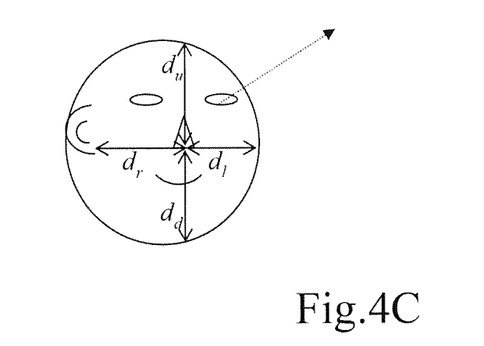

Refer to FIG. 4A and FIG. 4B for the estimation of the rotation angle of the face, wherein the face does not rotate in FIG. 4A and rotates leftward in FIG. 4B. As shown in FIG. 4A, the distance between the nose and the right boundary of the face is denoted by $d_r$, and the distance between the nose and the left boundary of the face is denoted by $d_l$. The rotation angle of the face can be calculated from Equation (1):

$$\text{The rotation angle of the face} \doteq F * \left( 90° - \frac{\text{MIN}(d_l, d_r)}{d_l + d_r} * 180° \right) \quad (1)$$

wherein F is the environmental factor, such as the focal length of the image capture device or the distance between the face and the image capture device. After the face has rotated rightwards, $d_r$ is minimum. After the face has rotated leftwards, $d_l$ is minimum. Refer to FIG. 4C schematically showing the driver turns his fixation toward the upper left, wherein the distance between the nose and the upper boundary of the face is denoted by $d_u$, and the distance between the nose and the lower boundary is denoted by $d_d$, and the angle of fixation rotation≈$\tan^{-1}$ (the vertical component of fixation displacement/the horizontal component of fixation displacement).

Figure 5A:
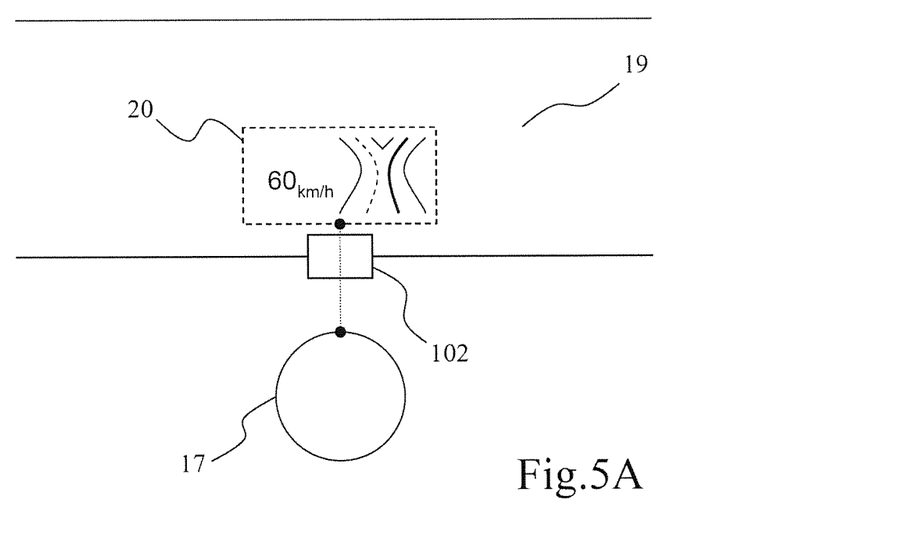
FIG. 5A is a diagram schematically showing the projection area while the driver is fixating at the front according to one embodiment of the present invention.
Figure 5B:
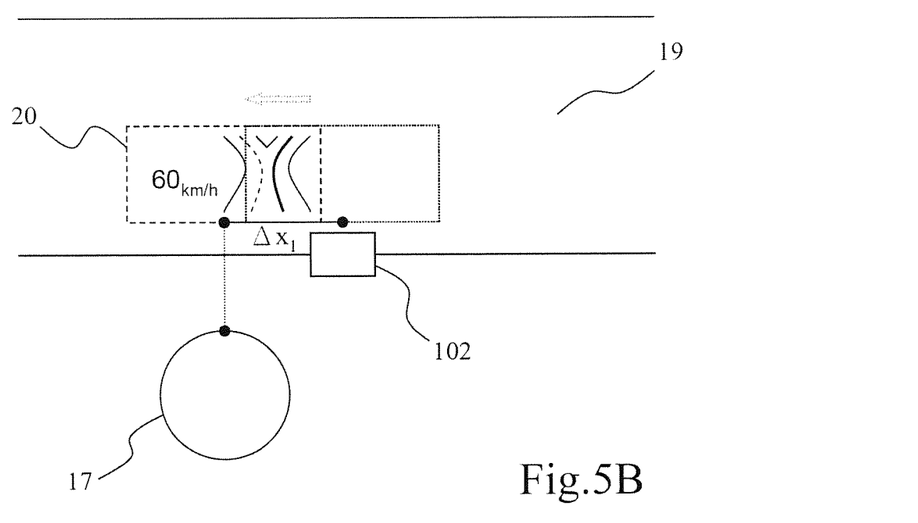
FIG. 5B and FIG. 5C are diagrams respectively schematically showing the projection area while the driver moves his head and the projection area while the driver turns his head according to one embodiment of the present invention.
Figure 5C:
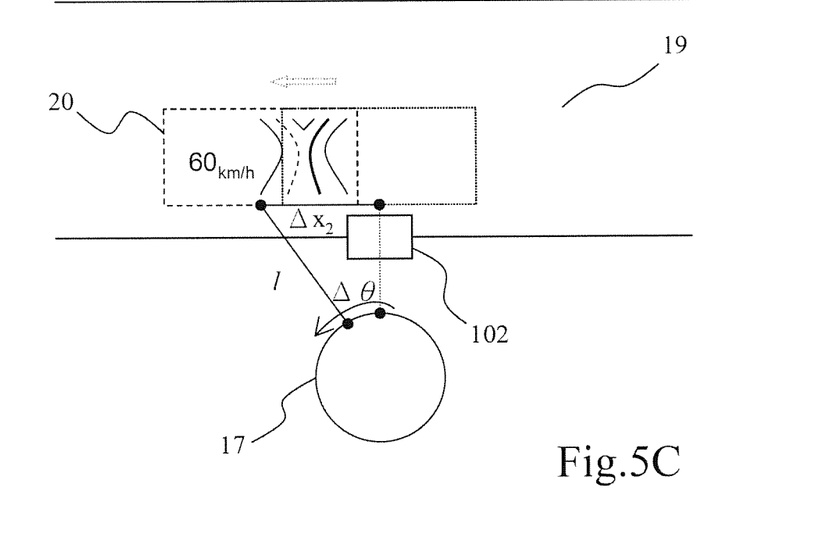

Refer to FIGS. 5A-5C diagrams schematically showing how to calculate the required displacement of the projection area from the position of the driver's head or the fixation direction. Suppose that the image of the driving information is projected on the windshield 19. In FIG. 5A, the head of the driver 17 is directly ahead of the steering wheel, i.e. exactly before the image capture device 102. In such a case, the projection area 20, the image capture device 102 and the sightline of the driver 17 are all at an identical straight line. Suppose that the abovementioned case is at a time point T, and suppose that the driver 17 moves his head leftward at the next time point T+1, as shown in FIG. 5B. Thus, the projection area 20 should be displaced correspondingly. The required displacement of the projection area 20 is denoted by $\Delta x_1$, and $\Delta x_1 = r_1 \cdot (P_{t+1} - P_t) + c_{shift}$, wherein $r_1$ is a proportional parameter; P is a set of coordinates of the position of the head; $c_{shift}$ is a modification value of installation error of the image capture device 102; t is the time point. Suppose that the driver 17 does not translate his head but turns his head, as shown in FIG. 5C. Thus, the projection area 20 should be displaced leftward corresponding to the rotation of the head of the driver 17. The required displacement of the projection area 20 is denoted by $\Delta x_2$, $\Delta x_2 = r_2 \cdot l \cdot \tan(\Delta\theta) + c_{shift}$, wherein $r_2$ is a proportional parameter; l is the distance between the eye of the driver 17 and the projection area 20; $\theta$ is the rotation angle of the head of the driver 17; $c_{shift}$ is a modification value of installation error of the image capture device 102. The required displacement of the projection area 20 $\Delta x_1$ or $\Delta x_2$ can be used to calculate the offsets of the parameters of the projection device 16. Then, the projection device 16 is shifted to an appropriate position or rotated to an appropriate angle so as to project the image of driving information onto a new projection area. If the projection device 16 is not moved to the correct position yet or the driver cannot view the complete image from the projection area 20 of the projection device 16 yet, the calculation is repeated to adjust the offsets of the parameters of the projection device 16 until the driver can view the complete image of the driving information.

In conclusion, the present invention proposes an information display system automatically adjusting the projection area and a method thereof. The present invention detects facial features of a driver, calculates the altitude of the eyes with respect to the ground, the distance between the eyes and the detection module and the distances between the nose and the left, right, upper and lower boundaries, and detects the position of the driver' head and the rotation of the driver's face, whereby to work out the required displacement of the projection area, adjust the offsets of the parameters of the projection device, and vary the projection angle of the projection device. Thereby, the present invention can automatically adjust the projection area of the information display system to make the driver always able to view the complete image of the driving information even though the driver has obviously changed his posture.

The embodiments described above are only to exemplify the present invention but not to limit the scope of the present invention. Any equivalent modification or variation according to the characteristic or spirit of the present invention is to be also included within the scope of the present invention.

What is claimed is:

1. An information display system automatically adjusting a projection area, comprising
   a detection module capturing images of a driver and measuring a distance between said detection module and said driver;
   a projection device projecting at least one image of driving information onto said projection area before said driver;
   a data processing module connected with said detection module, using said images of said driver and said distance between said detection module and said driver to recognize facial features of said driver, recording parameters of said projection device, using said facial features and said parameters to estimate a required displacement of said projection area; and
   a controller connected with said data processing module and said projection device, estimating at least one offset of said parameters of said projection device according to said required displacement of said projection area, driving said projection device to move or rotate according to said at least one offset of said parameters to make said projection device project images of driving information onto a new projection area, wherein said at least one offset of said parameters of said projection device includes a shift distance or a rotation angle of said projection device.

2. The information display system automatically adjusting said projection area according to claim 1, wherein said detection module at least includes an image capture device capturing images of said driver and a distance measurement device measuring a distance between said detection module and said driver.

3. The information display system automatically adjusting said projection area according to claim 2, wherein said distance measurement device is an infrared distance measurement device.

4. The information display system automatically adjusting said projection area according to claim 1, wherein said facial features include 3D positional coordinates of eyes of said driver, an eyelid status of said driver, a rotation angle of said face of said driver, and a direction said driver fixates.

5. The information display system automatically adjusting said projection area according to claim 1, wherein said parameters of said projection device include a position and an angle of said projection device.

6. An information display method automatically adjusting a projection area, comprising steps:
   using a detection module to capture images of a driver and measure a distance between said detection module and said driver;
   using said images of said driver and said distance between said detection module and said driver to recognize facial features of said driver, recording parameters of a projection device, using said facial features and said parameters to estimate a required displacement of said projection area of said projection device;
   estimating at least one offset of said parameters of said projection device according to said required displacement of said projection area, wherein said at least one offset of said parameters of said projection device includes a shift distance or a rotation angle of said projection device; and
   driving said projection device to move or rotate according to said at least one offset of said parameters to make said projection device project images of driving information onto a new projection area.

7. The information display method automatically adjusting said projection area according to claim 6, wherein said parameters of said projection device include a position and an angle of said projection device.

8. The information display method automatically adjusting said projection area according to claim 6, wherein a displacement of a head of said driver is worked out before said required displacement of said projection area is estimated, and wherein said required displacement of said projection area is denoted by $\Delta x$, and $\Delta x = r_1 \cdot (P_{t+1} - P_t) + c_{shift}$, and wherein $r_1$ is a proportional parameter; P is a set of coordinates of a position of said head of said driver; $c_{shift}$ is a modification value of installation error of said detection module; t is a time point.

9. The information display method automatically adjusting said projection area according to claim 6, wherein a rotation angle of a head of said driver is worked out before said required displacement of said projection area is estimated, and wherein said required displacement of said projection area is denoted by $\Delta x$, and $\Delta x = r_2 \cdot l \cdot \tan(\Delta\theta) + c_{shift}$, wherein $r_2$ is a proportional parameter; l is a distance between eyes of said driver and said projection area; $\Delta\theta$ is said rotation angle of said head of said driver; $c_{shift}$ is a modification value of installation error of said detection module.

10. The information display method automatically adjusting said projection area according to claim 6, wherein if said projection device is not moved to a correction position to project images of driving information onto a correct area, said at least one offset of said parameters of said projection device is estimated continually.

\* \* \* \* \*